(12) United States Patent
Choyi et al.

(10) Patent No.: US 11,979,743 B2
(45) Date of Patent: May 7, 2024

(54) SYSTEMS AND METHODS FOR SECURE ACCESS TO 5G NON-PUBLIC NETWORKS USING MOBILE NETWORK OPERATOR CREDENTIALS

(71) Applicant: Verizon Patent and Licensing Inc., Basking Ridge, NJ (US)

(72) Inventors: Vinod Kumar Choyi, Conshohocken, PA (US); Samita Chakrabarti, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 17/349,436

(22) Filed: Jun. 16, 2021

(65) Prior Publication Data
US 2022/0408256 A1    Dec. 22, 2022

(51) Int. Cl.
| | |
|---|---|
| *H04W 12/06* | (2021.01) |
| *H04W 12/03* | (2021.01) |
| *H04W 12/0431* | (2021.01) |
| *H04W 12/08* | (2021.01) |
| *H04W 12/72* | (2021.01) |
| *H04W 12/75* | (2021.01) |

(52) U.S. Cl.
CPC ......... *H04W 12/068* (2021.01); *H04W 12/03* (2021.01); *H04W 12/0431* (2021.01); *H04W 12/08* (2013.01); *H04W 12/72* (2021.01); *H04W 12/75* (2021.01)

(58) Field of Classification Search
CPC ............... H04W 12/068; H04W 12/03; H04W 12/0431; H04W 12/08; H04W 12/72; H04W 12/75
See application file for complete search history.

(56) References Cited

U.S. PATENT DOCUMENTS

| | | | |
|---|---|---|---|
| 9,985,947 B1* | 5/2018 | Elhard | H04L 63/08 |
| 2014/0052981 A1* | 2/2014 | King | H04L 63/0869 |
| | | | 713/155 |
| 2019/0081934 A1* | 3/2019 | Noda | H04L 9/3213 |
| 2019/0223246 A1* | 7/2019 | Huang-Fu | H04W 76/18 |
| 2020/0296113 A1* | 9/2020 | Agarwal | H04L 63/0876 |
| 2022/0060893 A1* | 2/2022 | Gundavelli | H04L 63/08 |
| 2022/0123950 A1* | 4/2022 | Erickson | G06F 9/5072 |
| 2022/0124497 A1* | 4/2022 | Lin | H04W 12/08 |
| 2022/0159460 A1* | 5/2022 | Ben Henda | H04W 12/041 |
| 2022/0232506 A1* | 7/2022 | Lai | H04W 8/02 |
| 2022/0240210 A1* | 7/2022 | Lai | H04W 60/00 |
| 2022/0286850 A1* | 9/2022 | Lin | H04W 12/72 |
| 2022/0286996 A1* | 9/2022 | Lin | H04W 12/068 |
| 2022/0353941 A1* | 11/2022 | Lin | H04W 76/15 |
| 2022/0376986 A1* | 11/2022 | Sheppard | H04L 41/06 |

(Continued)

*Primary Examiner* — Khalid M Almaghayreh

(57) ABSTRACT

One or more devices may include a credentials server. The credentials server may be configured to: receive primary Standalone Non-Public Network (SNPN) credentials for a User Equipment device (UE) and SNPN information. The primary SNPN credentials and the SNPN information are associated with the UE and an SNPN. The devices may be configured to generate temporary SNPN credentials based on the primary SNPN credentials and the SNPNN information. The devices may forward the temporary SNPN credentials to the SNPN.

20 Claims, 10 Drawing Sheets

(56) References Cited

U.S. PATENT DOCUMENTS

2022/0408251 A1* 12/2022 Castellanos Zamora ............... H04W 8/08
2023/0099786 A1* 3/2023 Xiang .................. H04W 12/75
370/329

* cited by examiner

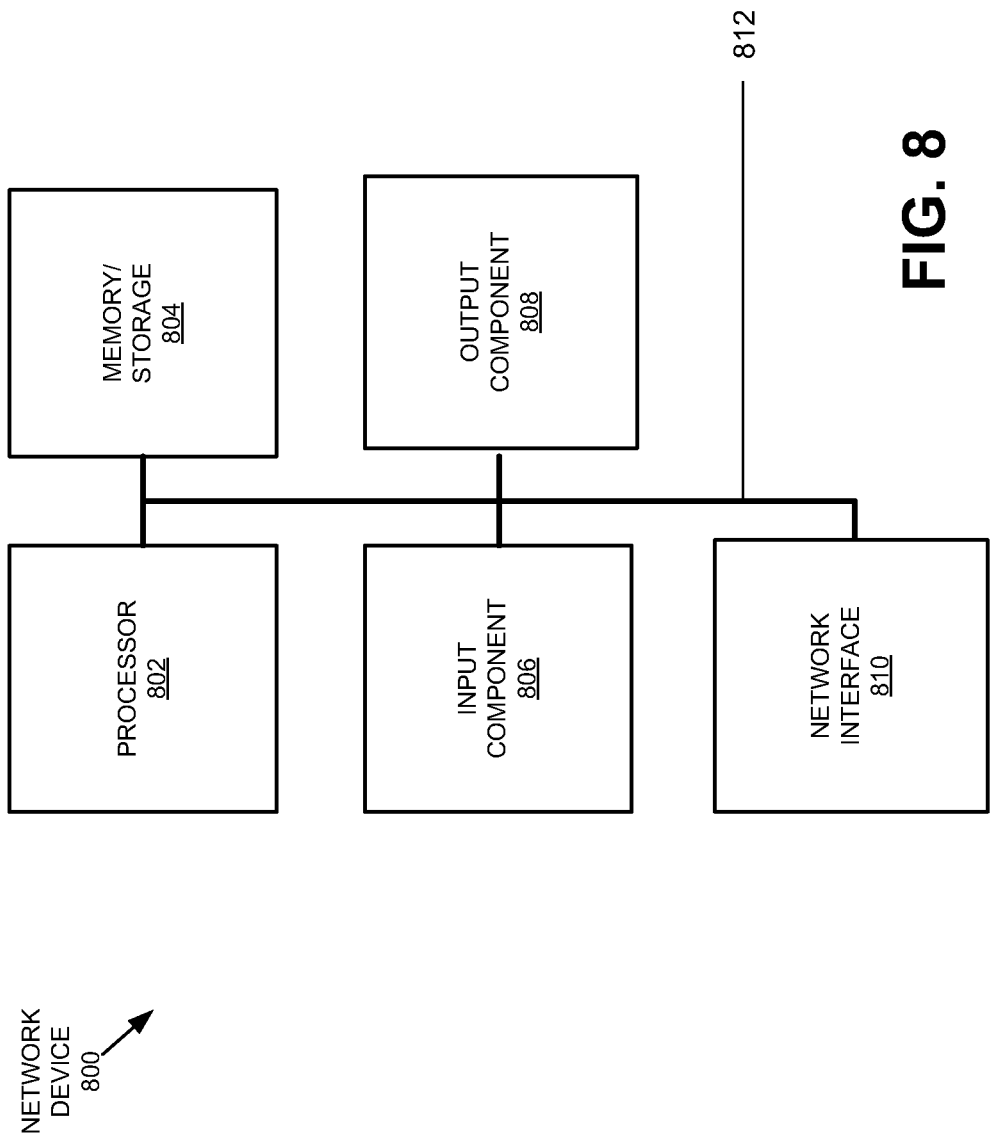

US 11,979,743 B2

SYSTEMS AND METHODS FOR SECURE ACCESS TO 5G NON-PUBLIC NETWORKS USING MOBILE NETWORK OPERATOR CREDENTIALS

BACKGROUND INFORMATION

Advanced wireless networks, such as Fifth Generation (5G) networks, incorporate many new advances in technology. For example, a 5G network may have the capability to perform network slicing to increase network efficiency and performance. In another example, a 5G radio network may include New Radio (NR)-related features, such as Self Organizing Network (SON) capabilities, splitting a wireless station function into a Central Unit (CU) and Distributed Units (DUs), and Integrated Access and Backhaul nodes.

Although a 5G network may or may not incorporate all of the preceding technological features, a 5G network may nonetheless offer greatly improved performance over predecessor networks. Accordingly, many organizations are implementing their own private 5G networks, otherwise known as 5G non-public networks (NPNs).

BRIEF DESCRIPTION OF THE DRAWINGS

FIG. 8 illustrates example components of a network device according to an implementation.

DETAILED DESCRIPTION OF EXAMPLE EMBODIMENTS

The following detailed description refers to the accompanying drawings. The same reference numbers in different drawings may identify the same or similar elements.

Fifth Generation (5G) Non-Public networks (herein referred to herein as 5G NPNs or simply NPNs) provide 5G communication services to organizations or enterprises, unlike Public Land Mobile Networks (PLMN) that are open to the public at large. NPNs may be implemented within the premises of an organization, such as a government building, a factory, an industry site, or a school. To an organization, a NPN can provide high-quality services that are relatively isolated from other networks and users that do not belong to the organization. Such isolation can facilitate putting in place various security-related measures in NPNs, including PLMN-Integrated-NPNs (PNI-NPNs) and Standalone NPNs (SNPNs). A PNI-NPN is deployed together with a PLMN and shares infrastructure with the PLMN. An SNPN is deployed as an isolated and standalone network. However, increased isolation of NPNs can lead to issues in authenticating and registering UEs across NPNs and the PLMN, as explained below with reference to FIG. 1. The systems and methods described herein address these issues, to simplify the authentications/registrations of the UEs across the PLMN (also referred to herein as Mobile Network Operator (MNO) network) and one or more NPNs.

Figure 1:
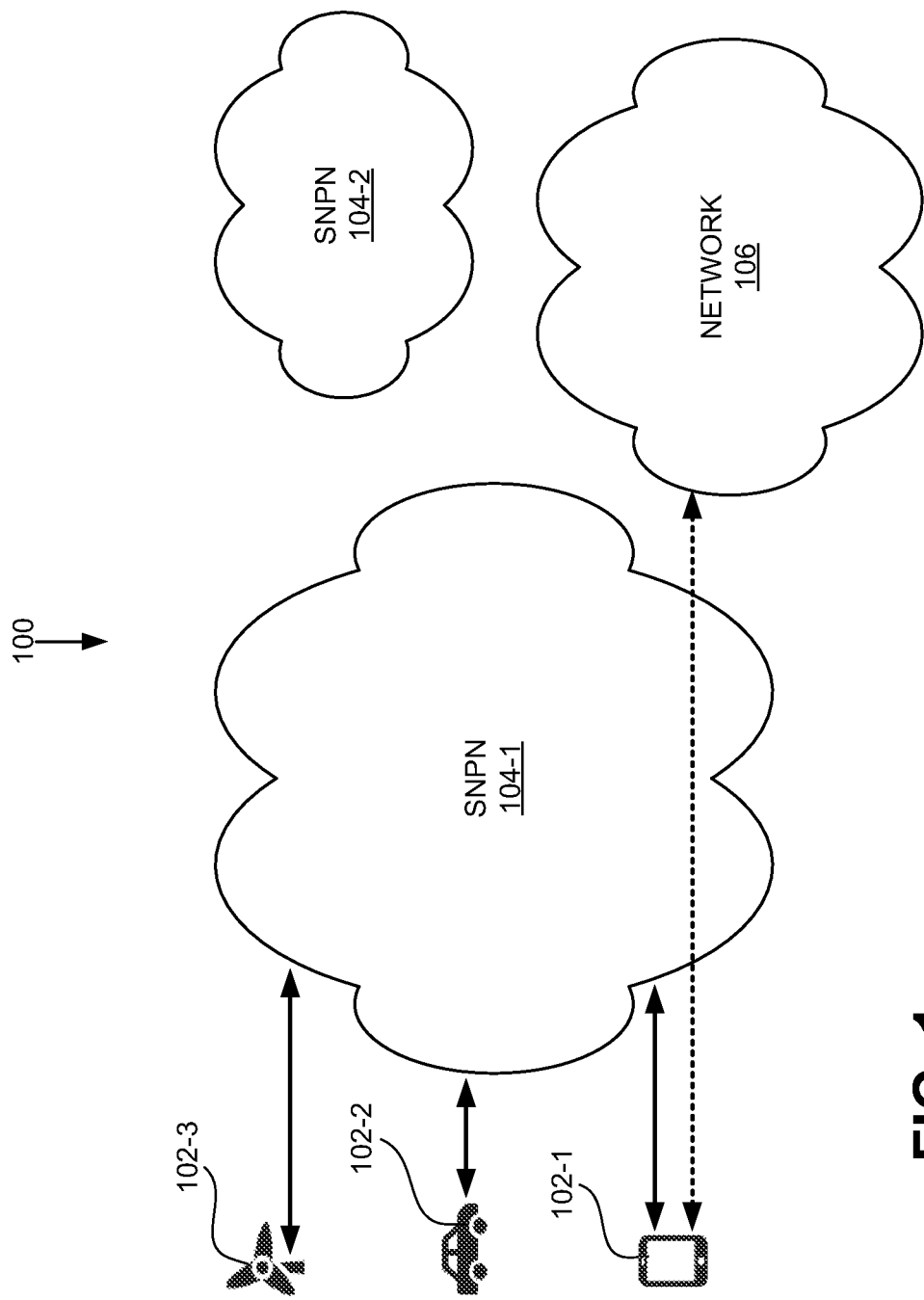
FIG. 1 illustrates an example network environment in which the systems and methods described herein may be implemented.

FIG. 1 illustrates an example network environment 100 in which the systems and methods described herein may be implemented. As shown, network environment 100 may include UEs 102 (UE 102-1, UE 102-2, and UE 102-3) and SNPNs 104 (SNPN 104-1 and SNPN 104-2), and a network 106 (also referred to as MNO network 106). Although the FIG. 1 and shows SNPNs but not PNI-NPNs, descriptions that follow apply to other implementations that include PNI-NPNs, which may contain data-plane part of the core network (of MNO network 106) in the customer premises and all or part of the control plane part of MNO network 106.

UE 102 may include a wireless communication device. UE 102 may include capabilities for voice communication, mobile broadband services (e.g., video streaming, real-time gaming, premium Internet access etc.), best effort data traffic, and/or other types of applications. In some implementations, UE 102 may correspond to an Internet-of-Things (IoT) device, a wireless Machine-Type-Communication (MTC) device that communicates with other devices over a machine-to-machine (M2M) interface, such as Narrow Band (NB)-IoT devices or a dual Radio Access Technology (RAT) devices with capabilities as both New Radio (NR) devices and/or Long-Term-Evolution devices (e.g., LTE-Machines (also known as Category M1 (CAT-M1)). An IoT device (e.g., an Industrial IoT or home IoT) may be large, medium-sized, or small device (e.g., a video camera, robots, automatic guided vehicles, etc.). More specific examples of different types of UE 102 include: a smart phone; a tablet device; a wearable computer device (e.g., a smart watch); a laptop computer; a portable gaming system; an Internet-of-Thing (IoT) device; and a global positioning system (GPS) device.

Examples of UE 102 in an organization premises covered by SNPNs may include: sensor devices, such as a health monitoring device (e.g., a blood pressure monitoring device, a blood glucose monitoring device, etc.) in hospitals; an asset tracking device (e.g., a system monitoring the geographic location of a fleet of vehicles, etc.) in a college campus; a climate controlling device (e.g., a thermostat, a ventilation system, etc.) in a building; a device controlling a manufacturing system (e.g., a robot arm, an assembly line, etc.) in a factory; a sensor and/or a device controlling a security system (e.g., a camera, a motion sensor, a window sensor, etc.) within a building; a device controlling a power system (e.g., a smart grid monitoring device, a utility meter, a fault diagnostics device, etc.); and/or another type of electronic device.

SNPN 104 and network 106 (also referred to as provider network 106 or MNO network 106) may each include an access network (e.g., a 5G NR network). An access network may allow UE 102 to access the 5G core network associated with one of SNPN 104 or network 106. To do so, the access network may establish and maintain, with participation from UE 102, an over-the-air channel with UE 102; and maintain backhaul channels with the 5G core network (e.g., a 5G core network in SNPN 104-1, SNPN 104-2, or network 106). The access network may convey information through these channels, from UE 102 to the 5G core network and vice versa. The access network may also convey data from/to UE 102 to/from a data network in SNPN 104/network 106 or an external network coupled to SNPN 104/network 106.

Each SNPN 104 and network 106 may also include a 5G core network. A 5G core network 206 may allow the delivery of Internet Protocol (IP) services to UE 102 and may interface with other networks, such as a network external to SNPN 104 and/or network 106 or to a data network within the 5G core network. The 5G core network may comprise 5G core network components. Examples of 5G core network components include: a User Plane Function (UPF), an Application Function (AF), an Access and Mobility Function (AMF), a Session Management Function (SMF), a Unified Data Management (UDM) function, a Unified Data Repository (UDR) function, a Policy Control Function (PCF), an Authentication Server Function (AUSF), a Network Repository Function (NRF), and a Network Exposure Function (NEF). Some of these are described below with reference to FIG. 3B.

Assume that in FIG. 1, each of UE 102-1, UE 102-2, and UE 102-3 has access to MNO network 106 but also needs to access SNPN 104-1 and SNPN 104-2. The systems and methods described herein use credentials for UEs 102 at network 106 to drive automatic generation of new credentials for UEs 102 at SNPNs 104-1 and/or 104-2, at network 106, and at UEs 102. The new credentials may include temporary credentials and/or permanent credentials. After the generation of the new credentials at SNPNs 104, UEs 102 may authenticate and register at the SNPNs 104. Processes that are associated with generating temporary and permanent credentials are described below in greater detail with reference to FIGS. 4, 5, 6A-6D, 7A and 7B.

The system permits the MNO, which may manage various services at SNPNs 104, to offload authentication and registration-related processes to SNPNs 104 after the new credentials have been generated. By leveraging the existing UE credentials at MNO network 106, the system permits the MNO or the organization associated with SNMPs 104 to avoid having to manually generate and provision credentials anew at each SNPNs 104 for each of UEs 102.

Figure 2B:
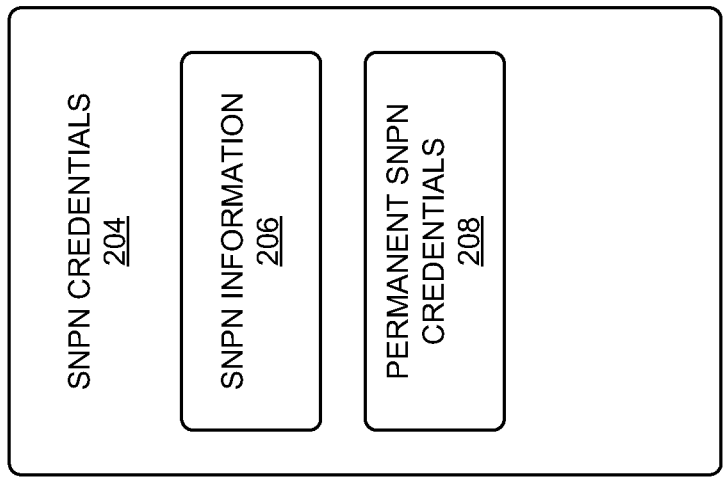
FIGS. 2A and 2B illustrate example security information stored in a User Equipment device (UE) according to an implementation.
Figure 2A:
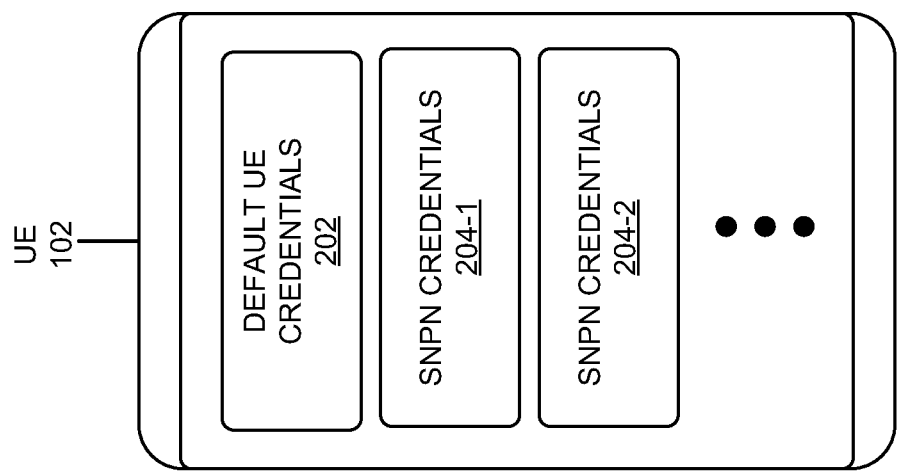

FIGS. 2A and 2B illustrate example security information stored in UE 102. Although UE 102 is depicted as a smart phone, in an actual implementation, UE 102 may be any device in accordance the above description of UE 102. As shown in FIG. 2A, UE 102 may store default credentials 202 and NPN credentials sets 204-1 through 204-N. Depending on the implementation, the credentials may be stored in a persistent storage medium, such as a Subscriber Identity Module (SIM), embedded SIM, and embedded Universal Integrated Circuit Card (eUICC). The information stored within the persistent storage may be provided by different components, such as an Over-the-AIR (OTA) server within MNO network 106. Depending on the implementation, UE 102 may include other security information. In some implementations, the persistent storage medium may also include functions that are associated with security, encryption, and decryption, such as a pseudorandom function (PRF) (e.g., Hash-based Message Authentication Code (HMAC)), functions that implement Rivest-Shamir-Adleman (RSA), Elliptic Curve Integrated Encryption Scheme (ECIES), Diffie-Hellman, etc. For simplicity, FIG. 2A does not show all security related information and/or functions that may be stored in UE 102.

Default credentials 202 may include credentials that UE 102 use to be authenticated at MNO network 106 and to register at MNO network 106. Default credentials 202 may have been provided to UE 102 prior to its first access to MNO network 106.

SNPN credentials sets 204 (or SNPN credentials 204) may include a series of sets of credentials. Each set of credentials sets may correspond to a different SNPN 104 that UE 102 may access. As shown in FIG. 2B, each SNPN credentials 204 may include SNPN information 206 and permanent SNPN credentials 208. SNPN information 206 may include various information related to the SNPN, such as the SNPN Identifier (ID), random numbers (generated at various network components and sent to UE 102, SNPN home key (e.g., a public key associated with SNPN), etc. The permanent SNPN credentials comprise a permanent SNPN credentials Identifier (SSUPI) and a permanent SNPN credentials key (SK). UE 102 may use permanent SNPN credentials 208 to authenticate at the SNPN in the manner described below.

Figure 3A:
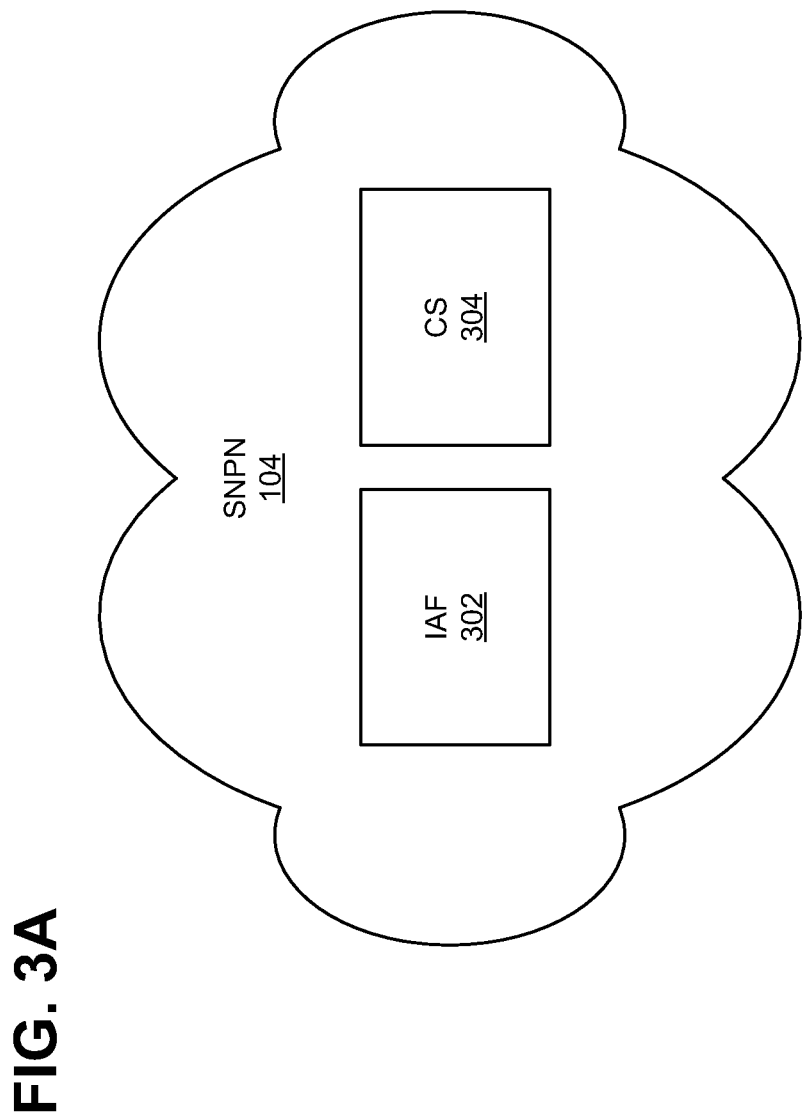
FIGS. 3A and 3B illustrate, respectively, example security components in a Public Land Mobile Network (PLMN) and a Standalone Non-Public Network (SNPN)

FIG. 3A illustrates example security components in SNPN 104 according to an embodiment. As shown, SNPN 104 may include an Identification and Authentication Function (IAF) 302 and Credentials Store (CS) 304. Depending on the embodiment, IAF 302 and/or CS 304 may be implemented as part of other network components. For example, IAF 302 may be implemented as part of Authentication Server Function (AUSF), which is one of 5G core network component; and CS 304 may be implemented as part of Unified Data Repository (UDR). In other implementations, IAF 302 and CS 304 may be implemented as separate network components.

IAF 302 may receive requests to authenticate UE 102 (via one of network components in SNPN 104), obtain the SNPN credentials from network 106 or from CS 304, and authenticate UE 102 based on the obtained SNPN credentials. When IAF 302 obtains permanent SNPN credentials, and if the permanent SNPN credentials are not stored in CS 304, IAF 302 may send them to CS 304 for persistent storage.

CS 304 may include a repository or database of permanent SNPN credentials for UEs 102. As mentioned above, temporary SNPN credentials may be active for a given time period during which the permanent SNPN credentials are generated—hence the temporary SNPN credentials need not be stored. When requested by IAF 302, CS 304 may retrieve permanent SNPN credentials and provide them to IAF 302.

Figure 3B:
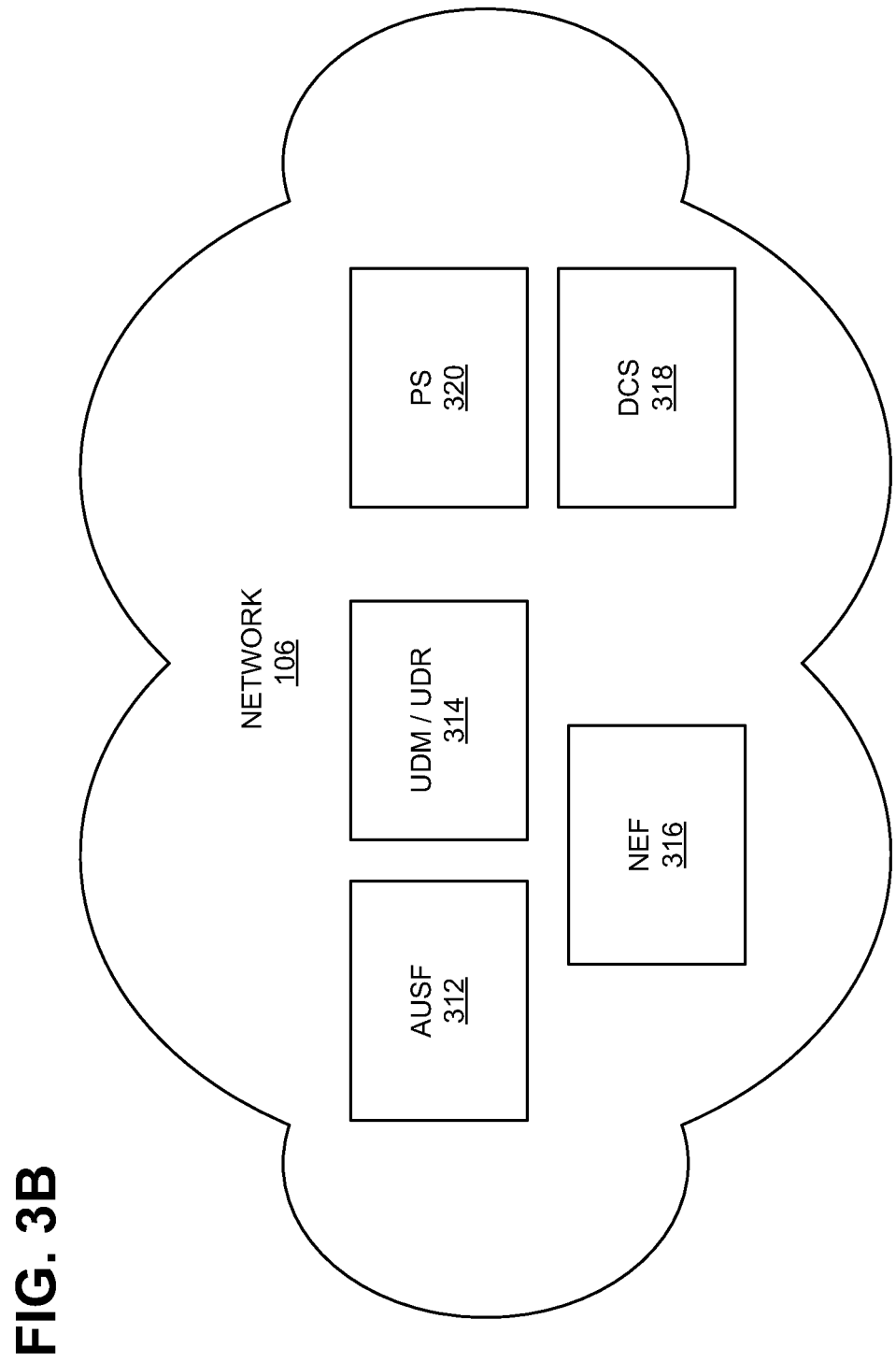

FIG. 3B illustrates example security components of network 106 according to an embodiment. As shown, network 106 may include an Authentication Server Function (AUSF) 312 (also referred to as an authentication server 312), a Unified Data Management (UDM)/Unified Data Repository (UDR) 314 (also referred to as a unified data management server/unified data repository server 314), a Network Exposure Function (NEF) 316 (also referred to as a network exposure server 316), a Default Credentials Server (DCS) 318, and a Provisioning Server 320.

AUSF 312 may manage authentication data for UEs 102. UDM/UDR 314 may maintain subscription information for UEs 102, manage subscriptions, handle user identification, perform access authorization based on subscription data, perform network function registration or subscription management, maintain service and/or session continuity by maintaining assignment of Session management Function (SMF) for ongoing sessions, support Short Messaging Service (SMS) message delivery, support lawful intercept functionality, and/or perform other processes associated with managing user data. The UDM may store the user subscription and/or other data in the UDR.

NEF 316 may expose capabilities and events to other network functions, including 3rd party network functions, application functions, edge computing network functions, and/or other types of network functions. Furthermore, NEF 316 may secure provision of information from external applications to network 106, translate information between network 106 and devices/networks external to network 106, support a Packet Flow Description (PFD) functions, and/or perform other types of network exposure functions.

DCS 318 may generate SNPN credentials. In some embodiments, DCS 318 may include a Pseudo-random function (PRF), such as a function based on Hash-based Machine Authentication Code (HMAC) HMAC-Secure Hashing Algorithm (SHA) 256 (HMAC-SHA3256), or yet another algorithm. Using PRFs is described below with reference to FIGS. 6A-6D. By using the PRF, DCS 318 may generate permanent SNPN credentials, either reactively when the UE 102 sends a request to activate a subscription to SNPN 104, or proactively when UE 102 authenticates and registers at network 106.

PS 320 may provision data/information to network components internal or external to network 106. For example, PS 320 may provision the authenticated/authorized UE 102 with the subscription data and optionally other configuration information. In another example, PS 320 may provision SNPN 104 with temporary SNPN credentials. DCS 318 and/or PS 320 may be owned by an MNO or a 3rd party security service provider. In some implementations, DCS 318 and/or PS 320 may be located in the customer premises. PS 320 may store credentials for NPNs and/or SNPN 104 and UE-specific information (e.g., information not beyond subscription credentials).

For clarity, FIGS. 1, 3A, and 3B do not show all networks or network components that may be included in environment 100 and/or SNPNs 104 and network 106. For example, environment 100 may include many more SNPNs 104 and MNO networks 106. In another example, SNPNs 104 and network 106 may include bridges, routers, servers, switches, and other core network functions (e.g., 5G core network functions, 4G core network functions, etc.).

Furthermore, depending on the embodiment, functions described or illustrated as being performed by one component may be performed by other components. For instance, in some embodiments, AUSF 312 may include DCS 318 or vice versa. In another example, DCS 318 and PS 320 may be included in a network separate from network 106, rather than as part of network 106. In another example, SNPNs 104 may be replaced with PNI-NPNs. In this configuration, the PNI-NPNs would each include IAF 302 and CS 304. RAN and the control plane of PNI-SNPNs would be shared with MNO network 106, which would be responsible for providing isolation to the PNI-NPNs and data plane components (e.g., UPF, AMF, and SMF) in the PNI-NPN premises. Thus, depending on the implementation, networks 104 and 106 in FIGS. 1, 3A and 3B may include additional, fewer, different, or a different arrangement of components than those illustrated.

Figure 4:
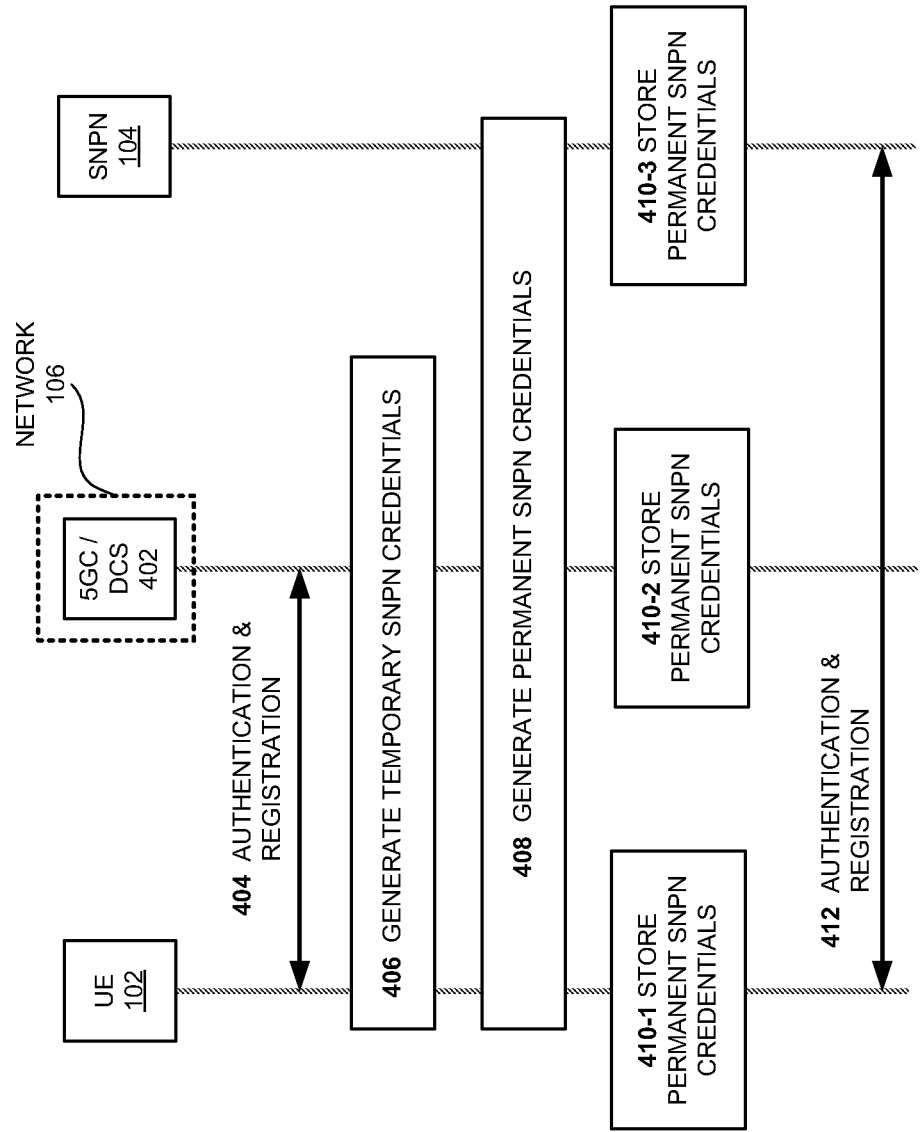
FIG. 4 is a diagram depicting example high level signal flows and actions that are associated with a process for generating credentials for authenticating a UE at an SNPN.

FIG. 4 is a diagram depicting example high level signal flows and actions that are associated with a process for using UE credentials at network 106 to automatically generate SNPN credentials for the UEs 102. The process is performed by UE 102, DCS 318 or 5G Core (5GC) components (collectively referred to as components 402), and components in SNPN 104 (see FIG. 3A). Each arrow or block shown in FIG. 4 may be associated with exchange of one or more signals and/or messages and performance of one or more actions.

As shown, the process may include UE 102 authenticating and registering at 5GC components 402 (arrow 404). For example, after establishing a Radio Resource Control (RRC) connection with a 5G Radio Access Network (RAN) in network 106, UE 102 may authenticate and register via AUSF 312 and/or UDM/UDR 314 in 5GC/DCS 402. After the registration, UE 102 and 5GC/DCS 402 each may generate a temporary SNPN credentials (block 406).

Thereafter, if 5GC/DCS 402 and SNPN 104 determine (in the manner described below) that permanent SNPN credentials are needed for UE 102, then UE 102, 5G/DCS 402, and SNPN 104 generate the permanent SNPN credentials (block 408). Furthermore, UE 102 stores the permanent SNPN credentials in its local storage (e.g., eSIM) and SNPN 104 stores the permanent SNPN credentials in CS 304 or another secure storage (blocks 410-1 and 410-3). Optionally, 5GC/DCS 402 may also store the permanent SNPN credentials (block 410-2.

After storing the SNPN credentials, UE 102 may use the permanent SNPN credentials to authenticate at SNPN 104 (arrow 412), without any involvement by the MNO or MNO network 106. That is, a direct authentication procedure is established between UE 102 and SNPN 104. In addition, depending on the embodiment, there may be a lifetime associated with the permanent SNPN credentials, despite the term "permanent." Upon the expiry of the lifetime, UE 102 and/or a user may be required to renew the permanent SNPN credentials. The renewal may involve a procedure that involves participation from MNO network 106.

Figure 5:
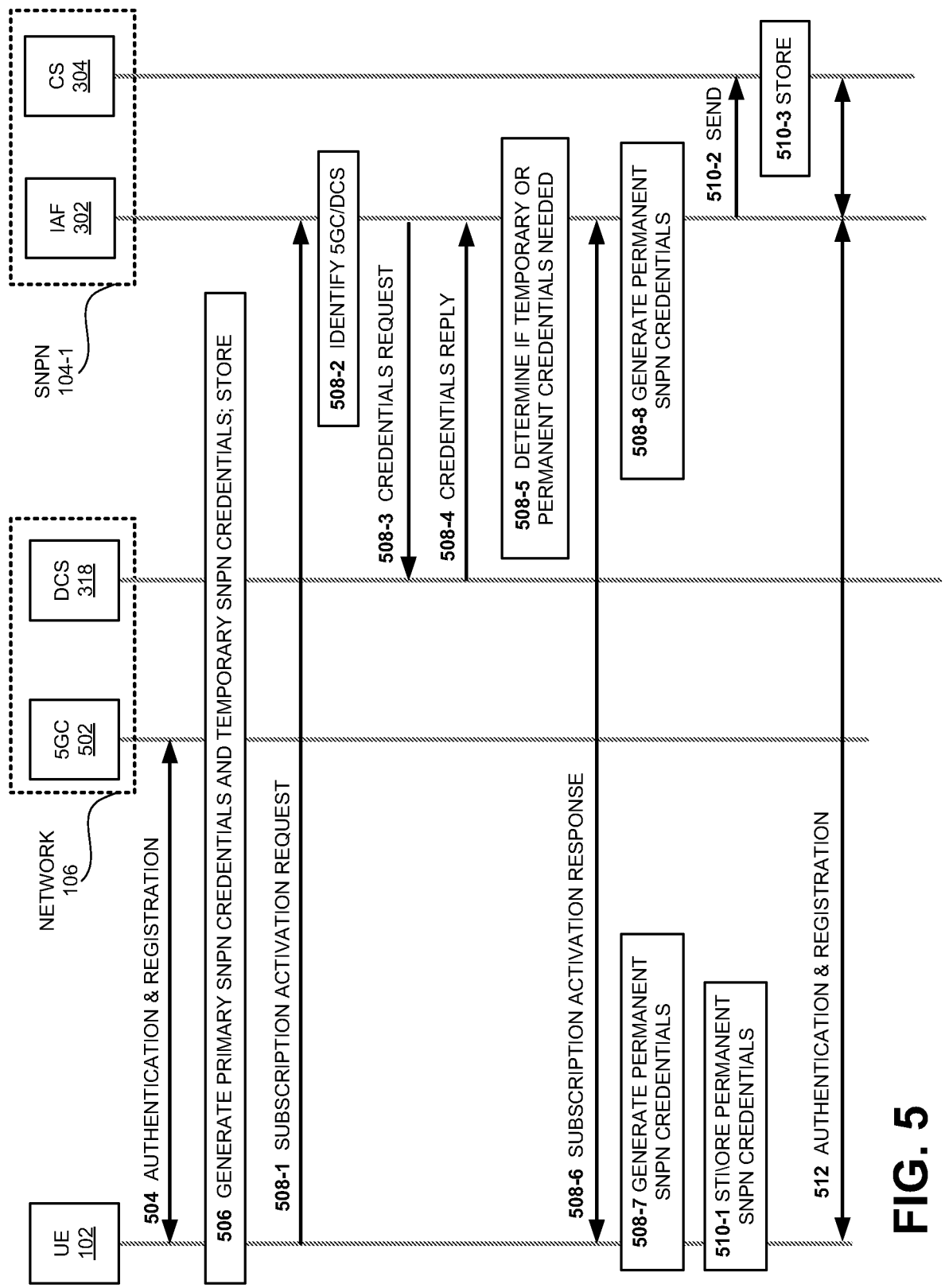
FIG. 5 is a diagram depicting example signal flows and actions that are associated with another process for generating credentials for authenticating a UE at an SNPN.

FIG. 5 is a diagram depicting example signal flows and actions that are associated with another process for using UE credentials at network 106 to automatically generate SNPN credentials for the UEs 102. The process is performed by UE 102, 5GC 502 and DCS 318 in network 106, and IAF 302 and CS 304 in SNPN 104. The process depicted in FIG. 5 is a more detailed implementation of the process illustrated in FIG. 4. The process of FIG. 5 may be viewed as reactive, because, in the process, DCS 318 provides temporary SNPN credentials to an SNPN 104 in response to signaling from the SNPN 104. As in FIG. 4, each arrow or block shown in FIG. 5 may be associated with exchange of one or more signals and/or messages and performance of one or more actions.

As shown, the process may include UE 102 authenticating and registering at 5GC 502 (arrow 504). Thereafter, 5GC 502 provides UE 102 with SNPN information. The SNPN information includes: SNPN Identifiers (IDs) for each SNPNs 104 that UE 102 has the authorization to access (depending on the UE profile in the UDR of 5GC 502); and an SNPN home key for each SNPN 104 that UE 102 has the authorization to access. An SNPN home key is the public key for SNPN 104, either generated at a Certificate Authority or at SNPN 104 itself. The SNPN information may also include random numbers generated at 5GC 502—the random numbers may be used for generating temporary or permanent SNPN credentials, as explained below.

In addition to providing UE 102 with the SNPN information, 5GC 502 (e.g., at AUSF 312) either generates primary SNPN credentials (block 504). Each primary SNPN credentials include a primary SNPN credentials ID (SPI) and a primary SNPN credentials key (SPK). For each of the SNPNs 104 (in FIG. 5, SNPN 104-1), 5GC 502 passes the primary SNPN credentials and the SNPN information to DCS 318. In some implementations, rather than passing the primary SNPN credentials to DCS 318, 5GC 502 may simply pass the SNPN information to DCS 318 to have DCS 318 generate the primary SNPN credentials.

5GC 502 also passes the SNPN information to UE 102, which uses the SNPN information to generate the primary SNPN credentials. Next, each of UE 102 and DCS 318 then uses the SPI, the SPK, and the SNPN information to generate temporary SNPN credentials (block 506). The temporary SNPN credentials include a temporary SNPN credentials ID (STI) and a temporary SNPN credentials key (STK).

Figure 6B:
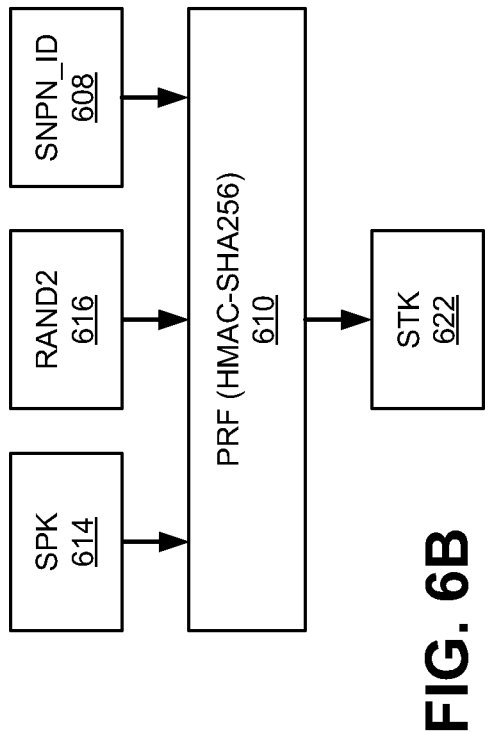
FIGS. 6A-6D illustrate example generation of various security keys in processes for generating credentials for authenticating UEs at an SNPN.
Figure 6D:
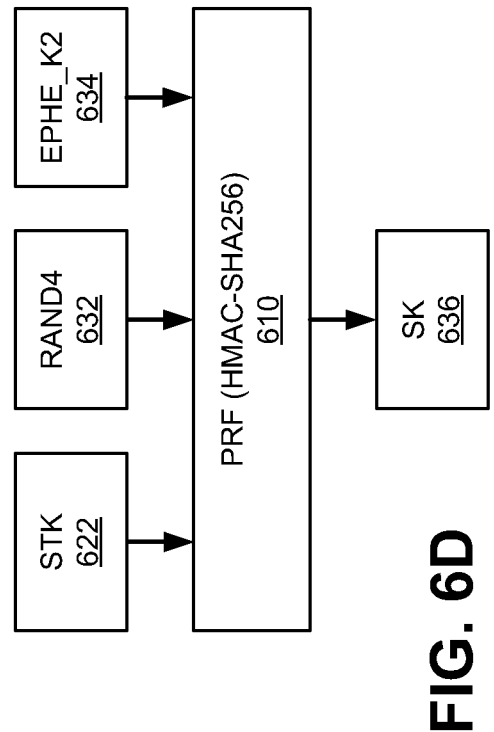
Figure 6A:
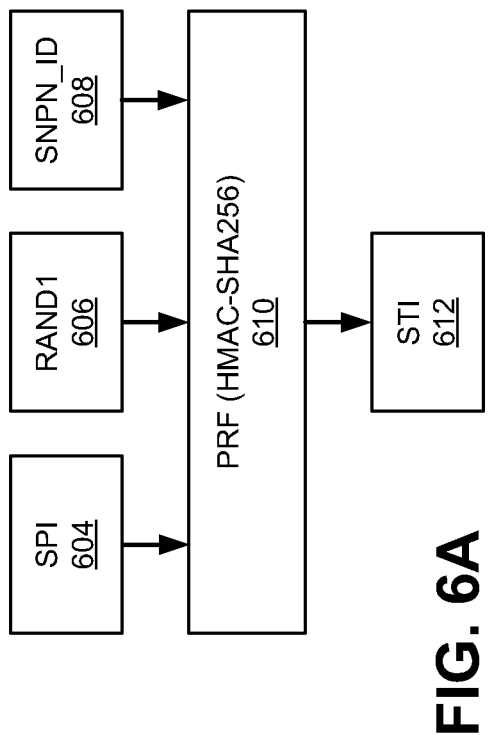

FIGS. 6A and 6B illustrate example generation of an STI and an STK. In FIG. 6A, PRF 610 (implemented in UE 102 and DCS 318) takes the SPI 604, the random number 606, and the SNPN ID 608 as inputs and generates the STI 612. In FIG. 6B, PRF 610 takes the SPK 614, a random number 616, and the SNPN ID 608 as inputs and generates the STK 622. Depending on the implementation, random number 606 and random number 616 may be the same number or a different number. Furthermore, the number 606/616 may be generated via a pseudo-random number generator or a physical device (e.g., Quantum Random Number Generator).

The process of FIG. 5 further includes UE 102 sending a subscription activation request to SNPN 104-1 (i.e., to IAF 302 of SNPN 104-1) (arrow 508-1). The subscription activation request includes an encrypted STI, which the UE 102 has created using the SNPN home key for the SNPN 104-1. When IAF 302 in SNPN 104-1 receives the request, IAF 302 uses the private key for SNPN 104-1 to decrypt the encrypted STI. IAF 302 uses the decrypted STI to identify 5GC 502 and/or DCS 318 (block 508-2). If the STI is not reused, then it can be optionally encrypted. The policies provided by the home network after arrow 504 to UE may indicate if the STI is expected to be encrypted or not. If the STI is encrypted, then the STI may be used within the serving SNPN network for all identification purposes, similar to a 5G Globally Unique Temporary Identifier (5G-GUTI) that is used by the Network 106. If the STI is encrypted, then optionally, based on policies on the permanent identity, SSUPI may take the value of the STI. In some cases, the network 106 may share the 5G-GUTI with the SNPN 104, in which case, the STI takes the value of the 5G-GUTI.

The process of FIG. 5 further includes IAF 302 sending a credentials request to DCS 318 (arrow 508-3). The credentials request includes an encrypted STI that IAF 302 has generated using the public key associated with DCS 318 (or network 106) and using the decrypted STI.

When DCS 318 receives the credentials request from IAF 302, DCS 318 decrypts the encrypted STI using the private key of DCS 318 (or network 106) to obtain the decrypted STI. Furthermore, DCS 318 uses the decrypted STI to retrieve the corresponding STK and a credentials usage parameter value associated with UE 102. The credentials usage parameter value may be obtained from the user profile associated with UE 102 (e.g., stored in the UDR of 5GC 502 or another database) and may indicate: whether UE 102 has access to SNPN 104-1; and the type of authentication credentials that has to be generated and used for mutual authentication of the UE 102 and the SNPN 104. The credentials usage parameter value may be unique for each of the SNPN 104 for which the UE has a subscription.

DCS 318 then encrypts each of the STI, the STK, and the credentials usage parameter value using the SNPN home key and forwards the encrypted STI, the encrypted STK, and the encrypted credentials usage parameter value, in a credentials reply (arrow 508-4). The encryption of the STI and STK may be achieved using secure protocols (e.g. via TLS) and therefore the complete messages may be encrypted as well. When IAF 302 receives the reply, IAF 302 decrypts the encrypted STI, the encrypted STK, and the encrypted credentials usage parameter value, using its private key. IAF 302 uses the decrypted credentials usage parameter value to determine whether UE 102 is to obtain a permanent SNPN credentials (block 508-5).

At IAF 302, if the credentials usage parameter value indicates that the UE 102 has only the authority to have the temporary SNPN credentials, IAF 302 may send a subscription activation response, to UE 102, that includes the credentials usage parameter value (arrow 508-6). In some implementations, once in possession of the credentials reply from IAF 302, UE 102 may access SNPN 104-1 resources under various restrictions.

At IAF 302, if the credentials usage parameter value indicates that the UE 102 is to have permanent SNPN credentials, IAF 302 may generate one or two random numbers (herein referred to as RAND3 and RAND4) and/or alternatively generate one or two ephemeral keys (herein referred to as EPHE_K1 and EPHE_K2). IAF 302 then forwards the random numbers RAND3 and RAND4 and the ephemeral keys EPHE_K1 and EPHE_K2 in the credentials reply to UE 102 (arrow 508-6). The UE may then generate another set of random numbers (referred to as RAND5 and RAND6) and may also alternatively generate an ephemeral key (referred to as EPHE_K2). Assuming that the credentials usage parameter value indicates that UE 102 is to have the permanent SNPN credentials, UE 102 and IAF 302 each separately generate the permanent SNPN credentials (bock 508-7 and 508-8). The use of the random numbers, the ephemeral key for the generation of SNPN credentials, and/or the algorithm in the PRF, as well as the entropy requirements for generation of the random numbers and the ephemeral keys may either be pre-provisioned by the network 106, or provisioned by the network 106 as part of message exchanged (during block 506) or negotiated between the UE 102 and the IAF 302. If permanent SNPN credentials are expected to be generated based on credentials usage parameter, then use of ephemeral keys in addition to the random numbers may be used in generation of the SNPN permanent credentials. Optionally, increased entropy in generating random numbers may be carried out for generating permanent SNPN credentials. The policies relating to the cryptographic properties such as strength of the cryptographic algorithm, key strength, random values, ephemeral keys and entropy of the random values and keys may communicated by the network 106 to the SNPN 104 (arrow 508-4) and to the UE 102 (arrow 506). Alternatively, the UE 102 and the SNPN 104 may negotiate the cryptographic properties and optionally, the UE 102 and the SNPN 104 may further negotiate the cryptographic properties based on the policies provided by the network 106.

Figure 6C:
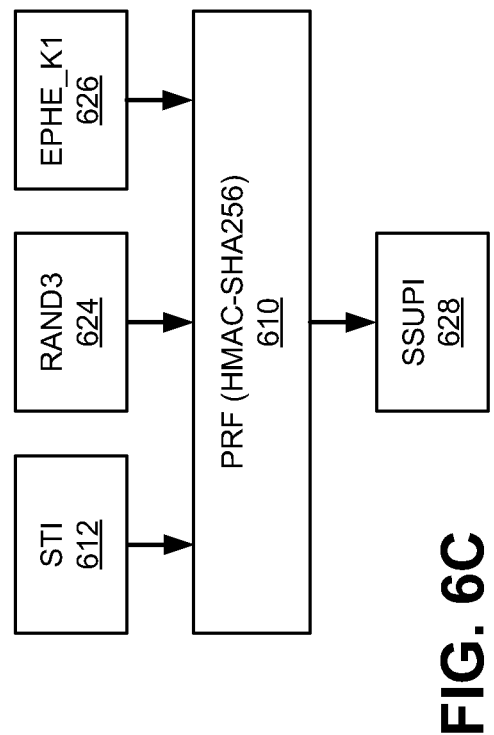

FIGS. 6C and 6D illustrate example generation of permanent SNPN credentials, which include a permanent SNPN credentials ID (SSUPI) and a permanent SNPN credentials key (SK). In FIG. 6C, PRF 610 (implemented in UE 102 and IAF 302) takes the STI 612, the random number RAND3 624, and/or the key EPHE_K1 626 as inputs and generates the SSUPI 628. In FIG. 6D, PRF 610 takes the STK 622, the random number RAND4 632, and/or the ephemeral key EPHE_K2 634 as inputs and generates the permanent SNPN credentials key SK 636. Depending on the implementation, the random number 624 and random number 632 may be the same number or a different number. Furthermore, the random numbers 624/632 may be generated via a pseudo-random number generator or a physical device (e.g., Quantum Random Number Generator).

Once the permanent SNPN credentials have been generated at UE 102, UE 102 may store the permanent SNPN credentials in its persistent storage (e.g., a SIM, an eSIM, an eUICC, etc.) (block 510-1). After IAF 302 generates the permanent SNPN credentials on its own, IAF 302 may send the generated permanent SNPN credentials to CS 304 (arrow 510-2). CS 304 may store the permanent SNPN credentials. Thereafter, UE 102 may use the permanent SNPN credentials that UE 102 generated to authenticate and/or register (arrow 512) at SNPN 104-1.

Figure 7A:
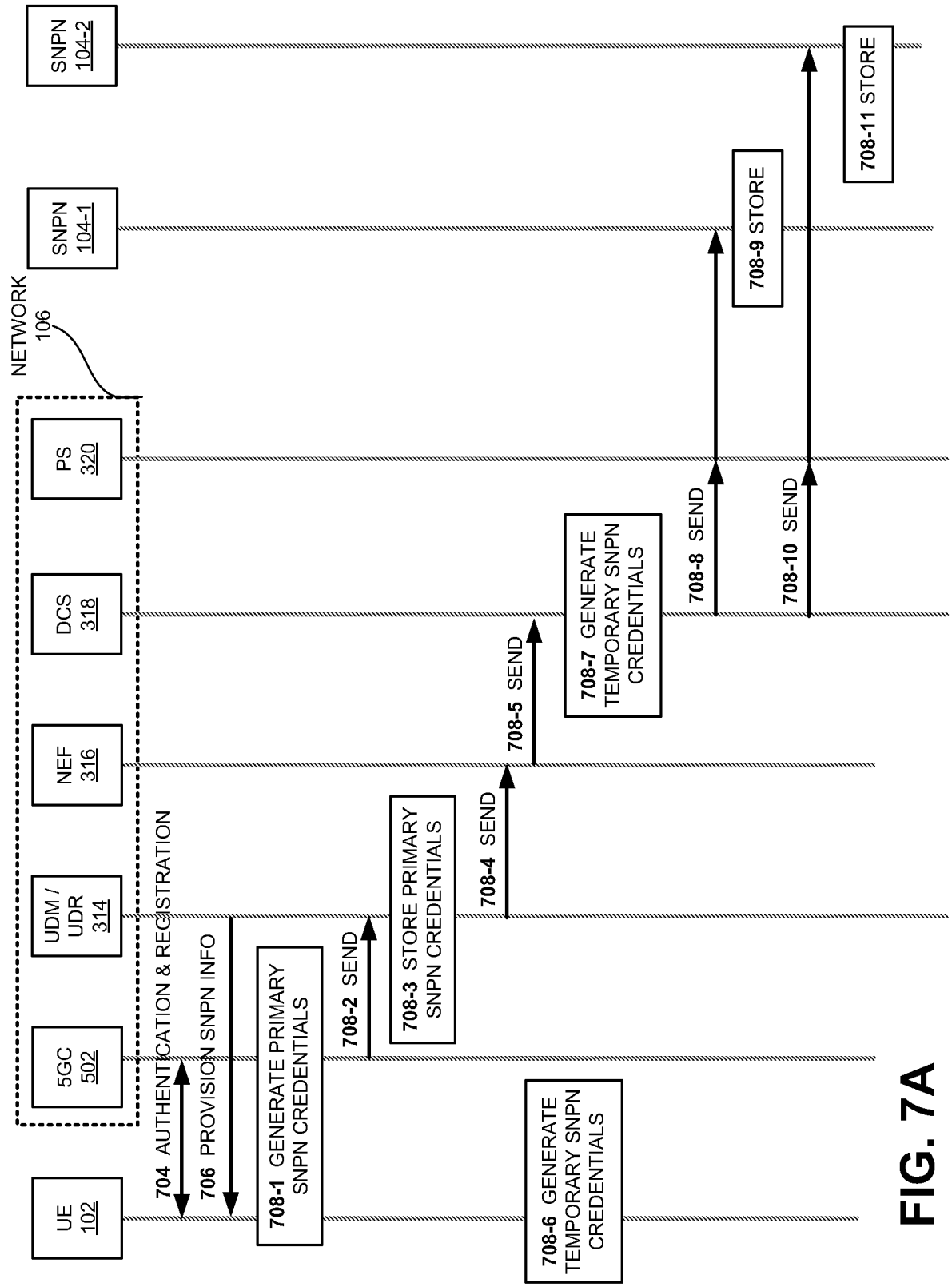
FIGS. 7A and 7B are diagrams depicting example signal flows and actions that are associated with yet another process for generating credentials for authenticating UEs at SNPNs.
Figure 7B:
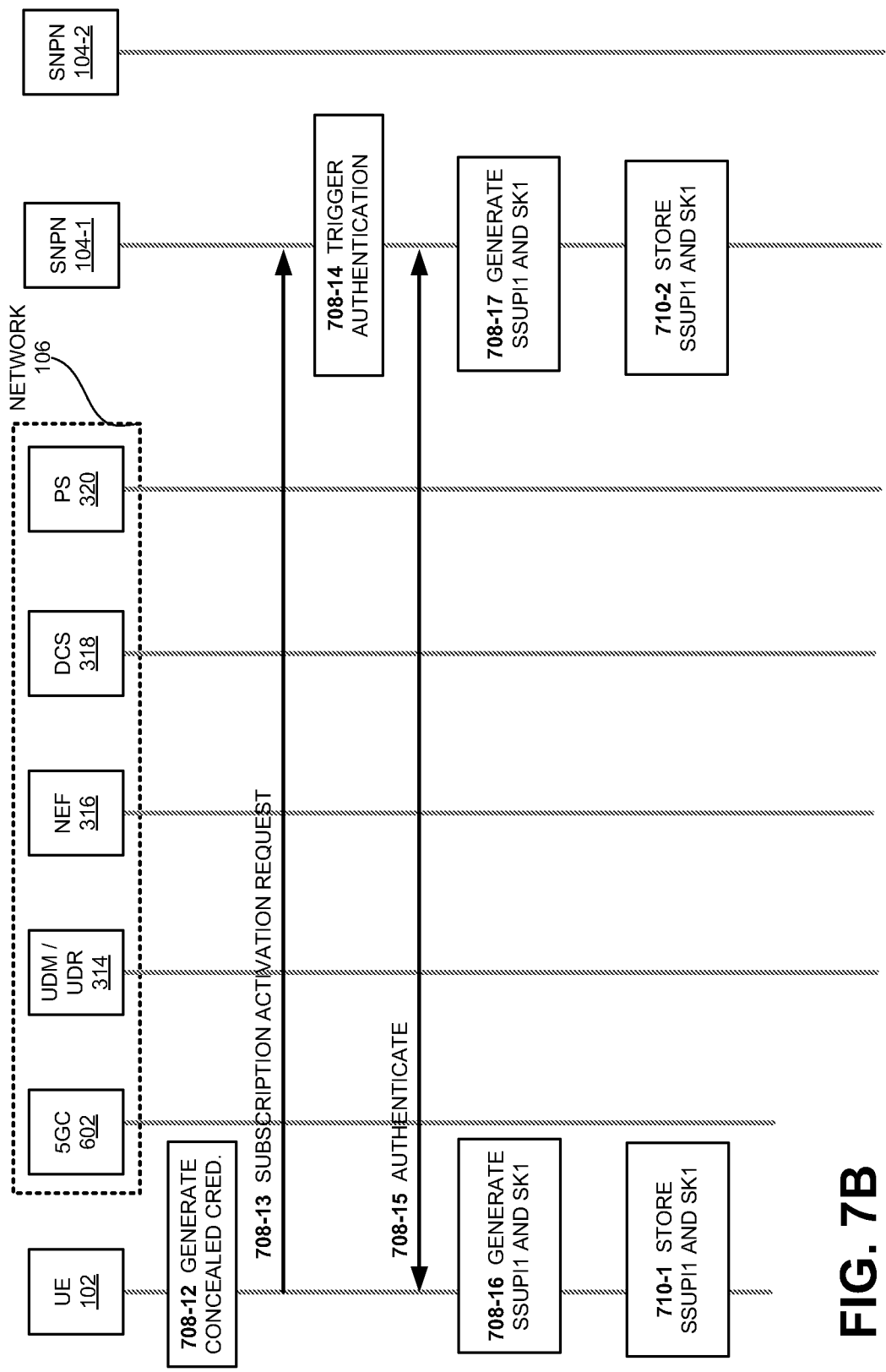

FIGS. 7A and 7B are diagrams depicting example signal flows and actions that are associated with yet another process for using UE credentials at network 106 to automatically generate SNPN credentials for UEs 102. The process is performed by UE 102, 5GC 502, UDM/UDR 314, NEF 316, DCS 318, PS 320, SNPN 104-1, and SNPN 104-2. The process depicted in FIGS. 7A and 7B is a more detailed implementation of the process illustrated in FIG. 4. The process of FIGS. 7A and 7B may be viewed as proactive, because, in the process, network 106 pushes the temporary SNPN credentials via PS 320 to SNPNs 104-1 and 104-2, without receiving credentials request from SNPN 104-1 or SNPN 104-2. As in FIGS. 4 and 5, each arrow or block shown in FIGS. 7A and 7B may be associated with exchange of one or more signals and/r messages and performance of one or more actions. Assume that SNPN 104-1 and SNPN 104-2 have the public key associated with network 106 (e.g., 5GC 502 and/or DCS 318) and that 5GC 502 and/or DCS 318 has the public keys (also referred to has SNPN home keys SHK1 and SHK2) associated with SNPN 104-1 and SNPN 104-2. Furthermore, assume that DCS 318 is subscribed to NEF 316 for NEF notification service for receiving credentials and that NEF 316 is subscribed to UDM/UDR 314 to be notified of primary SNPN credentials newly stored at UDM/UDR 314.

As shown, the process may include UE 102 authenticating and registering at 5GC 502 (arrow 704). Thereafter, UDM/UDR 314 may provide UE 102 with SNPN information (arrow 706). The SNPN information includes: SNPN IDs for SNPN 104-1 and SNPN 104-2 (which UE 102 may have the authority access, depending on the UE profile in the UDM/UDR 314); an SNPN home key SHK1 for SNPN 104-1 and an SNPN home key SNK2 for SNPN 104-2. In some embodiments, the SNPN information may also include random numbers for generating credentials. SHK1 and SHK2 are the public keys for SNPN 104-1 and SNPN 104-2, respectively. SHK1 and SHK2 may have been either generated at a Certificate Authority or at SNPN 104-1 and SNPN 104-2.

The process of FIGS. 7A and 7B may further include, 5GC 502 (e.g., at AUSF 312) generating primary SNPN credentials for SNPNs 104 (block 708-1). Each primary SNPN credentials include a primary SNPN credentials ID (SPI) and a primary SNPN credentials key (SPK). For each of the SNPNs 104, UE 102 computes the primary SNPN credentials ID (SPI) and a primary SNPN credentials key (SPK) in the same manner as network components of 5GC 502 (e.g., UDM/UDR 314, AUSF 312). In addition, 5GC 502 passes the primary SNPN credentials and the SNPN information to UDM/UDR 314 for each of the SNPNs 104 (arrow 708-2). UDM/UDR 314 stores the primary SNPN credentials for SNPNs 104 (block 708-3) and the SNPN information. Optionally, UDM/UDR may store the primary SNPN credentials and Identifier for a lifetime that is shorter than the lifetime of the primary authentication credentials generated as part of the authentication and registration performed between UE 102 and the 5GC 502 (arrow 704).

Because NEF 316 is subscribed to UDM/UDR 314, when UDM UDR 314 stores the primary SNPN credentials and the SNPN information, UDM/UDR 314 sends/notifies NEF 316 of the availability of primary SNPN credentials and the SNPN information (arrow 708-4). Furthermore, because DCS 318 is subscribed to NEF 316 notification service for new primary SNPN credentials and new SNPN information, NEF 316 sends/notifies DCS 318 of the primary SNPN credentials and the SNPN information that it receives from UDM/UDR 314 (arrow 708-5).

Each of UE 102 and DCS 318 then uses the SPI, the SPK, and the SNPN information to generate a temporary SNPN credentials for each of SNPN 104-1 and SNPN 104-2 for which the UE 102 has a subscription (blocks 708-6 and 708-7). Each set of the temporary SNPN credentials includes a temporary SNPN credentials ID (STI) and a temporary SNPN credentials key (STK). When DCS 314 generates the temporary SNPN credentials that are unique for each of SNPN 104-1 and SNPN 104-2, DCS 314 forwards them and a credentials usage parameter value that is applicable for SNPNs 104 to PS 320 (arrows 708-8 and 708-10). In response, PS 320 provisions the temporary SNPN credentials and the credentials usage parameter value for SNPN 104-1, to SNPN 104-1 (specifically IAF 302 in SNPN 104-1). The credentials usage parameter value may indicate if the credentials to be generated are to be permanent or semi-permanent or temporary, depending on the particular SNPN. The credentials usage parameter may be determined based on policies. For example, the credentials usage parameter value may be permanent for SNPN 104-1 and temporary for SNPN 104-2.

In response to the provisioning, IAF 302 in SNPN 104-1 stores the received temporary SNPN credentials and the credentials usage parameter value at CS 320 in SNPN 104-1; and IAF 302 in SNPN 104-2 stores the received temporary SNPN credentials and the credentials usage parameter value at CS 320 in SNPN 104-2 (block 708-9 and 708-11).

Depending on the implementation, in transferring the temporary SNPN credentials and/or the credentials usage parameter values between network 106 and SNPNs 104, SNPNs 104 and network 106 may or may not apply public keys for SNPNs 104 and network 106 to exchange information. For example, in some implementations, PS 320 may use SHK1 to encrypt the temporary SNPN credentials and the credentials usage parameter value for SNPN 104-1 and send the encrypted credentials and the credentials usage parameter value to SNPN 104-1. When SNPN 104-1 receives the encrypted information, SNPN 104-1 may use its private key to decrypt the information.

Assuming that the credentials usage parameter value (which UE 102 received from UDM/UDR 314) indicates that UE 102 has the authority to have permanent SNPN credentials, UE 102 may encrypt the generated temporary SNPN credentials (e.g., STI) for SNPN 104-1 using the SNPN 104-1 home key SHK1 (FIG. 7B—block 708-12). Furthermore, UE 102 may send the encrypted temporary SNPN identifier, STI for SNPN 104-1 in a request to activate its subscription to SNPN 104-1 (arrow 708-13). When SNPN 104-1 receives the request, SNPN 104-1 (or IAF 302 in SNPN 104-1) may decrypt the encrypted temporary SNPN Identifier (STI) in the request and obtain the decrypted temporary SNPN credentials. If the STI is only used once, then the STI need not be encrypted and can be sent in the clear. However, for enhanced privacy protection that prevents snooping/tracking attacks from network 106, the STI may have been encrypted using SNPN home key (SHK1). After the decryption, SNPN 104-1 (IAF 302 in SNPN 104-1) may trigger an authentication procedure between UE 102 and SNPN 104-1 (arrow 708-14). Accordingly, UE 102 and SNPN 104-1 may engage in authentication (arrow 708-15). The authentication may include matching the temporary SNPN credentials obtained from UE 102 at 708-13 to the temporary SNPN credentials obtained from DCS 310 (via PS 320) at 708-8. The authentication may include challenge-response type of communications, wherein the UE and the SNPN network mutually proves possession of the SNPN credential (e.g. STK).

Assuming that UE 102 is authenticated at SNPN 104-1 based on the temporary SNPN credentials, UE 102 and SNPN 104-1 (e.g., IAF 302) may share random numbers and keys and use the shared random numbers and the keys to generate permanent SNPN credentials at UE 102 and at SNPN 104-1 (block 708-16 and 708-17). UE 102 and SNPN 104-1 may each store the generated permanent SNPN credentials locally. For example, UE 102 may store the permanent SNPN credentials in its embedded SIM and IAF 302 in SNPN 104-1 may store the permanent SNPN credentials in CS 320 in SNPN 104-1.

In FIG. 7B, signals and actions at arrows and blocks 708-12 through 710-2 roughly correspond to part of the generation of the permanent SNPN 104-1 credentials for UE 102 at SNPN 104-1 and at UE 102. Although not shown in FIG. 7B, UE 102 and SNPN 104-2 may exchange similar signals/messages and perform similar actions for generating the permanent SNPN 104-2 credentials for UE 102 at SNPN 104-2 and at UE 102. UE 102 and SNPN 104-2 may also each store the permanent SNPN 104-2 credentials locally.

FIG. 8 depicts exemplary components of an exemplary network device 800. One or more of network device 800 correspond to, are included in, or provide a hardware platform for implementation of any of the network components of FIGS. 1-7B (e.g., a router, a network switch, servers, gateways; components in SNPN 104-1, SNPN 104-2, and/or network 106; UEs 102; 5GC 502; IAF 302; CS 304; AUSF 312; UDM/UDR 314; NEF 316; DCS 318; PS 320; etc.). As shown, network device 800 includes a processor 802, memory/storage 804, input component 806, output component 808, network interface 810, and communication path 812. In different implementations, network device 800 may include additional, fewer, different, or a different arrangement of components than the ones illustrated in FIG. 8. For example, network device 800 may include a display, network card, etc.

Processor 802 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 800 and/or executing programs/instructions.

Memory/storage 804 may include static memory, such as read only memory (ROM), and/or dynamic memory, such as random-access memory (RAM), or onboard cache, for storing data and machine-readable instructions (e.g., programs, scripts, etc.).

Memory/storage 804 may also include a floppy disk, CD ROM, CD read/write (R/W) disk, optical disk, magnetic disk, solid state disk, holographic versatile disk (HVD), eUICC, eSIM, SIM, digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from device 800. Input and output components 806 and 808 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 800.

Network interface 810 may include a transceiver (e.g., a transmitter and a receiver) for network device 800 to communicate with other devices and/or systems. For example, via network interface 810, network device 800 may communicate with a wireless station in network 106 and/or SNPNs 104. Network interface 810 may also include an Ethernet interface to a LAN, and/or an interface/connection for connecting device 800 to other devices (e.g., a Bluetooth interface). For example, network interface 810 may include a wireless modem for modulation and demodulation.

Communication path 812 may enable components of network device 800 to communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory or storage (e.g., memory/storage 804, when executed by processor 802, may cause processor 802 to perform processes that are described herein.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While processes have been described above regarding arrows and blocks that represent signals, messages, and/or actions illustrated in FIGS. 4, 5, 7A, and 7B, the order of the blocks and arrows (and therefore their corresponding actions, messages, and signals) may be modified in other implementations. In addition, non-dependent processing (e.g., storing permanent SNPN credentials) may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A credentials server comprising:
a memory that includes instructions; and
a processor that executes the instructions to:
receive primary Standalone Non-Public Network (SNPN) credentials, for a User Equipment device (UE) different from the credentials server, and SNPN information, wherein the primary SNPN credentials and the SNPN information are associated with the UE and an SNPN;
receive a message for causing the credentials server to generate temporary SNPN credentials;
obtain a credentials usage parameter value that indicates whether the SNPN is to create permanent SNPN credentials;
generate the temporary SNPN credentials, which are active for a limited duration, based on the primary SNPN credentials and the SNPN information; and
forward the generated temporary SNPN credentials and the credentials usage parameter value to the SNPN,
wherein the credentials server is included in a network different from the SNPN.

2. The credentials server of claim 1, wherein when the processor receives the primary SNPN credentials, the processor is configured to:
receive the primary SNPN credentials from an authentication server or a unified data management server.

3. The credentials server of claim 1, wherein when the processor receives the primary SNPN credentials, the processor is configured to:
receive the primary SNPN credentials through a network exposure server that notifies the credentials server based on information received from an authentication server or a unified data management server.

4. The credentials server of claim 1, wherein when the processor generates the temporary SNPN credentials, the processor applies a pseudo-random function to a set of inputs to obtain a temporary SNPN credentials identifier (STI), wherein the set of inputs comprise:
a primary SNPN credentials identifier (SPI) that is included in the primary SNPN credentials;
a random number; and
an SNPN ID included in the SNPN information.

5. The credentials server of claim 1, wherein when the processor forwards the temporary SNPN credentials to the SNPN, the processor sends the temporary SNPN credentials, the SNPN information, and the credentials usage parameter value, toward a provisioning server that forwards the temporary SNPN credentials, the SNPN information, and the credentials usage parameter value to the SNPN.

6. The credentials server of claim 1, wherein when the processor forwards the temporary SNPN credentials to the SNPN, the processor is configured to:
encrypt the temporary SNPN credentials using a public key associated with the SNPN.

7. The credentials server of claim 1, wherein the message includes a request, from the SNPN, for the temporary SNPN credentials.

8. A system comprising:
one or more servers that include a first processor to:
authenticate a User Equipment device (UE), which is not included in the one or more servers, and register the UE;
generate primary Standalone Non-Public Network (SNPN) credentials for the UE based on SNPN information and a user profile associated with the UE;
provide the SNPN information to the UE and a default credentials server; and
provide the primary SNPN credentials to the default credentials server;
the default credentials server that includes a second processor to:
receive a message for causing the default credentials server to generate temporary SNPN credentials;
obtain a credentials usage parameter value that indicates whether the SNPN is to create permanent SNPN credentials;
generate the temporary SNPN credentials, which are active for a limited duration, based on the SNPN information and the primary SNPN credentials; and
a provisioning server to:
forward the generated temporary SNPN credentials and the credentials usage parameter value to an SNPN,
wherein the default credentials server and the provisioning server are included in a network different from the SNPN.

9. The system of claim 8, further comprising the SNPN, wherein the SNPN includes a third processor configured to:
receive the credentials usage parameter value via the default credentials server; and
when the credentials usage parameter value indicates that the permanent SNPN credentials are to be generated, forward a random number and a key to the UE.

10. The system of claim 8, wherein when the first processor provides the SNPN information to the UE, the first processor is configured to:
provide an SNPN identifier and a public key associated with the SNPN.

11. The system of claim 8, wherein the first processor is further configured to:
receive permanent SNPN credentials from the SNPN; and
store the permanent SNPN credentials in a persistent storage.

12. The system of claim 8, wherein after the second processor generates the temporary SNPN credentials, the second processor is further configured to:
  cause the provisioning server to forward the temporary SNPN credentials to the SNPN.

13. The system of claim 8, wherein before the second processor generates the temporary SNPN credentials, the first processor is configured to send random numbers to the UE, and
  wherein when the second processor generates the temporary SNPN credentials, the second processor uses the random numbers, the primary SNPN credentials, and the SNPN information to generate the temporary SNPN credentials.

14. The system of claim 13, wherein the temporary SNPN credentials include a temporary SNPN credentials identifier (ID) and a temporary SNPN credentials key, and wherein the primary SNPN credentials include a primary SNPN credentials ID and a primary SNPN credentials key.

15. A User Equipment device (UE) comprising:
  a memory to store instructions; and
  a processor to execute the instructions to:
    initiate a procedure for having the UE authenticated at a provider network;
    receive, from the provider network, Standalone Non-Public Network (SNPN) information associated with an SNPN;
    use the SNPN information to generate primary SNPN credentials;
    use the primary SNPN credentials and the SNPN information to have the provider network generate temporary SNPN credentials, which are active for a limited duration, and have the provider network forward the generated temporary SNPN credentials to the SNPN;
    send a request to activate a subscription to the SNPN, wherein the request includes the temporary SNPN credentials;
    have the UE authenticated at the SNPN using the temporary SNPN credentials;
    generate permanent SNPN credentials based on the temporary SNPN credentials; and
    store the permanent SNPN credentials,
  wherein the provider network is different from the SNPN.

16. The UE of claim 15, wherein when the processor stores the permanent SNPN credentials, the processor is configured to:
  store the permanent SNPN credentials in an embedded Subscriber Identity Module (SIM) or an embedded Universal Integrated Circuit Card (eUICC).

17. The UE of claim 15, wherein when the processor sends the request to activate the subscription, the processor is configured to:
  encrypt a temporary SNPN credentials identifier, of the temporary SNPN credentials using a public key associated with the SNPN, and wherein the SNPN information includes the public key.

18. The UE of claim 15, wherein when the processor generates the temporary SNPN credentials, the processor applies a pseudo-random function to an SNPN identifier (ID), a random number, and a primary SNPN credentials ID, and
  wherein the primary SNPN credentials include the primary SNPN credentials ID and the SNPN information includes the SNPN ID.

19. The UE of claim 15, wherein when the processor generates the permanent SNPN credentials, the processor applies a pseudo-random function to a temporary SNPN credentials identifier (ID), a random number, and an SNPN ID,
  wherein the temporary SNPN credentials include the temporary SNPN credentials ID and the SNPN information includes the SNPN ID.

20. The UE of claim 15, wherein when the provider network forwards the generated temporary SNPN credentials to the SNPN, the provider network is further configured to send a credentials usage parameter value that indicates whether the SNPN is to create permanent SNPN credentials.

* * * * *